(12) United States Patent
Gupta et al.

(10) Patent No.: US 12,393,266 B2
(45) Date of Patent: Aug. 19, 2025

(54) SYSTEM AND METHOD FOR INTELLIGENT USER LOCALIZATION IN METAVERSE

(71) Applicant: SAMSUNG ELECTRONICS CO., LTD., Suwon-si (KR)

(72) Inventors: Vipul Gupta, Noida (IN); Abhishek Sharma, Noida (IN); Aryan Jaiswal, Noida (IN); Vaibhav Negi, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/510,135

(22) Filed: Nov. 15, 2023

(65) Prior Publication Data

US 2024/0103612 A1 Mar. 28, 2024

Related U.S. Application Data

(63) Continuation of application No. PCT/KR2023/014468, filed on Sep. 22, 2023.

(30) Foreign Application Priority Data

Sep. 23, 2022 (IN) .............................. 202241054613

(51) Int. Cl.
G06F 3/01 (2006.01)
G01C 21/16 (2006.01)
(Continued)

(52) U.S. Cl.
CPC ......... G06F 3/012 (2013.01); G01C 21/1656 (2020.08); G06T 7/0002 (2013.01);
(Continued)

(58) Field of Classification Search
CPC ......... G06T 19/006; G06T 7/70; G06F 3/012; G06F 3/013
See application file for complete search history.

(56) References Cited

U.S. PATENT DOCUMENTS 8,933,931 B2 1/2015 Balan et al.
9,070,219 B2 6/2015 McArdle et al.
(Continued)

FOREIGN PATENT DOCUMENTS

CN 108805987 A 11/2018
JP 2019-516261 A 6/2019
(Continued)

OTHER PUBLICATIONS

Huynh-The et al., "Artificial Intelligence for the Metaverse: A Survey", IEEE, Feb. 15, 2022, 24 total pages, arXiv:2202.10336v1.
(Continued)

*Primary Examiner* — Yuzhen Shen
(74) *Attorney, Agent, or Firm* — Sughrue Mion, PLLC

(57) ABSTRACT

The present disclosure provides a method for intelligent user localization in a metaverse, including: detecting movements of a wearable head gear configured to present virtual content to a user, and generating sensor data and visual data using an inertial sensor and a camera, respectively, mapping the visual data to a virtual world using an image associated with the visual data to localize the user in the virtual world; providing the visual data and the sensor data to a first Machine Learning (ML) model and a second ML model, respectively; extracting a plurality of key points from the visual data and distinguishing stable key points and dynamic key points; and removing visual impacts corresponding to the visual data having a relatively low weightage, and providing a relatively high weightage to the sensor data processed through the second ML model.

15 Claims, 6 Drawing Sheets

(51) Int. Cl.
  *G06T 7/00* (2017.01)
  *G06T 7/194* (2017.01)
  *G06T 7/246* (2017.01)
  *G06T 19/00* (2011.01)

(52) U.S. Cl.
  CPC .............. *G06T 7/194* (2017.01); *G06T 7/248* (2017.01); *G06T 19/006* (2013.01); *G06T 2207/20081* (2013.01); *G06T 2207/30168* (2013.01)

(56) References Cited

U.S. PATENT DOCUMENTS

| | | | |
|---|---|---|---|
| 9,338,200 | B2 | 5/2016 | Park et al. |
| 9,984,499 | B1 | 5/2018 | Jurgenson et al. |
| 10,089,790 | B2 | 10/2018 | Lawson et al. |
| 10,402,649 | B2 | 9/2019 | Rabinovich et al. |
| 10,679,378 | B1 | 6/2020 | Reddy et al. |
| 10,838,206 | B2 | 11/2020 | Fortin-DeschêNes et al. |
| 10,902,681 | B2 | 1/2021 | Uberti |
| 2012/0194644 | A1* | 8/2012 | Newcombe ............... G06T 7/20 348/46 |
| 2018/0005393 | A1* | 1/2018 | Senthamil ............... G06F 16/29 |
| 2020/0364554 | A1 | 11/2020 | Wang et al. |
| 2021/0166491 | A1 | 6/2021 | Green |
| 2021/0191424 | A1* | 6/2021 | Drayna ................... G05D 1/69 |
| 2021/0326584 | A1 | 10/2021 | Kim et al. |
| 2024/0119267 | A1* | 4/2024 | Kierat ................... G06N 3/045 |

FOREIGN PATENT DOCUMENTS

| | | |
|---|---|---|
| KR | 10-1923723 B1 | 11/2018 |
| KR | 10-2019-0041504 A | 4/2019 |
| WO | 2015/192117 A1 | 12/2015 |
| WO | 2020/254448 A1 | 12/2020 |

OTHER PUBLICATIONS

International Search Report (PCT/ISA/210) and Written Opinion (PCT/ISA/237) issued by the International Searching Authority on Jan. 5, 2024 in corresponding International Application No. PCT/KR2023/014468.

Communication dated Jun. 11, 2025, issued by Intellectual Property India in Indian Application No. 202241054613.

* cited by examiner

SYSTEM AND METHOD FOR INTELLIGENT USER LOCALIZATION IN METAVERSE

CROSS-REFERENCE TO RELATED APPLICATION(S)

This application is a bypass continuation of International Application No. PCT/KR2023/014468, filed on Sep. 22, 2023, which is based on and claims priority to India Patent Application No. 202241054613, filed on Sep. 23, 2022, in the Indian Intellectual Property Office, the disclosures of which are incorporated by reference herein in their entireties.

BACKGROUND

1. Field

The present disclosure relates to a system and a method for intelligent user localization in a metaverse. The present disclosure particularly relates to a system and a method for localization of user in metaverse using the information of the user in real time using multiple sensors, for improving user experience in the metaverse.

2. Description of Related Art

Virtual reality (VR) is a computer-generated three-dimensional environment that surrounds a user and responds to the user's actions in a natural way, typically via immersive Head-Mounted Displays (HMDs) or wearable hand devices. With virtual reality becoming a reality in the near future, significant technological advancements are anticipated to offer a quick and reliable system that can effectively bring users' experiences as close to reality as possible. A problem with the existing framework revolves around poor and unrealistic localization of users from the real world to the metaverse.

A problem with a previous implementation of human/user localization in the metaverse is unrealistic displacement of the user from one place to another, due to poor localization implementation in the device. The mechanism used in prior art relies on continuous and reliable visual tracking, which easily fails to track when the visual information is quite weak, such as the scenes with repeated textures, shimmering light, rapid camera movement causing motion blur, and so on. Existing solution may introduce some errors in tracking due to the biasness in sensors, or due to the distortion in mapping caused by the dynamic object and low reliability, causing unexpected, unintentional user movements in the virtual world. Furthermore, the existing solution may lose track of the user, and estimate that the user is not doing any activity despite his movements.

Additionally, conventional localization systems do not cover the preservation of user dynamism through real-world key point extraction and user inertial movements.

Another previous system uses an image capturing device to capture images corresponding to a user's view, and a processor to extract map points from these images. However, this system only discusses placing map points at suitable positions and transmitting pose information to the map. It lacks information on placing the user within the virtual world based on extracted field-of-view key points, and correcting location placement naturally through fusion of vision and inertial data.

Yet another prior art takes an image of the environment to generate a 3D point cloud that describes the surroundings, matches a segment of the image with key points in the 3D point cloud, and uses this match to align an augmented reality object within the environment images. However, this system solely addresses generating a location estimate based on the perspective of the captured image, and it does not cover the removal of unstable or unwanted key points that could lead to unrealistic movements of objects in the virtual world.

Hence, there has been a demand for a method to intelligently extract a valid set of key points from real-world vision data, for improving the accuracy of localization of user in the metaverse.

SUMMARY

One or more embodiments of the present disclosure may overcome the drawbacks of the prior art by disclosing a method for intelligent user localization in a metaverse.

According to an aspect of the present disclosure, a method for intelligent user localization in a metaverse, may include: detecting movements of a wearable head gear configured to present virtual content to a user, and generating sensor data and visual data using an inertial sensor and a camera, respectively, wherein the visual data captures a field of view of the user relative to one or more frame of reference; mapping the visual data to a virtual world using an image associated with the visual data to localize the user in the virtual world; providing the visual data to a first Machine Learning (ML) model; providing the sensor data to a second ML model; extracting a plurality of key points from the visual data and distinguishing stable key points and dynamic key points among the plurality of key points; removing the dynamic key points associated with the visual data using the first ML model; and removing visual impacts corresponding to the visual data having a relatively low weightage, and providing a relatively high weightage to the sensor data processed through the second ML model.

The method for removing the visual impacts corresponding to the visual input data having the having the relatively low weightage, may include: determining a quality of the key points associated with the visual data and the sensor data by computing a weight parameter; integrating the visual data and the sensor data, wherein the sensor data is first fed to the second ML model and then is integrated with the visual data; matching the visual data with output data of the second ML model by estimating a scale and initial gravity vector; and mapping the sensor data that is input from the inertial sensor, with the sensor data obtained from the second ML model based on a pre-learned weight.

The method may further include: filtering outliers and providing consistent data to the first ML model and the second ML model; and tracking the extracted key points using a tracking algorithm.

The inertial sensor and the camera may be mounted in the wearable head gear.

The visual data may be identified for preprocessing by extracting and tracking one or more sparse features from two consecutive frames of reference of a field of view of the user.

The key points may be extracted without filtration, based on tracked visual features and ML models.

The first ML model may include one or more Artificial Intelligence (AI) filters to distinguish the stable key points and the dynamic key points associated with the visual data.

The dynamic key points may be removed from the visual data using segmentation.

The plurality of key points exceeding a predetermined weight threshold may be obtained from a key point matrix by visual preprocessing.

According to another aspect of the present disclosure, a system for intelligent user localization in a metaverse, may include: a memory storing one or more instructions; and one or more processors configured to execute the one or more instructions to: provide visual data to a first machine learning (ML) model; provide sensor data to a second ML model; extract a plurality of key points associated with the visual data; distinguish stable key points and dynamic key points among the plurality of key points; remove the dynamic key points associated with the visual data using the first ML model; and remove visual impacts corresponding to the visual data having a relatively low weightage, and provide a relatively high weightage to the sensor data processed through the second ML model.

The memory may be communicatively coupled to the one or more processors.

The one or more processors may be configured to execute the one or more instructions to: determine a quality of the key points associated with the visual data by computing a weight parameter; integrate the visual data and the sensor data, wherein the sensor data is first fed to the second ML model and then is integrated with the visual data; match the visual data with output data of the second ML model by estimating a scale and initial gravity vector; and map the sensor data that is input from the inertial sensor, with the sensor data obtained from the second ML model data based on a pre-learned weight.

The sensor data may be extracted from an inertial sensor of the system.

The one or more processors may be configured to perform loop closure and pose optimization for reducing a localization error.

According to another aspect of the present disclosure, there is provided a non-transitory computer readable storage medium storing a program that is executable by one or more processors to perform a controlling method, the controlling method including: detecting movements of a wearable head gear configured to present virtual content to a user, and generating sensor data and visual data using an inertial sensor and a camera, respectively, wherein the visual data captures a field of view of the user relative to one or more frame of reference; mapping the visual data to a virtual world using an image associated with the visual data to localize the user in the virtual world; providing the visual data to a first Machine Learning (ML) model; providing the sensor data to a second ML model; extracting a plurality of key points from the visual data and distinguishing stable key points and dynamic key points, among the plurality of key points; removing the dynamic key points associated with the visual data using the first ML model; and removing visual impacts corresponding to the visual data having a relatively low weightage, and providing a relatively high weightage to the sensor data processed through the second ML model.

Thus, embodiments of the present disclosure provides a method for intelligent user localization in a metaverse. Additionally, the method also helps in maintaining the dynamic nature of the user based on key points collected from the real world and the user's inertial movements.

At least one of the plurality of modules may be implemented through an AI model. A function associated with AI may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
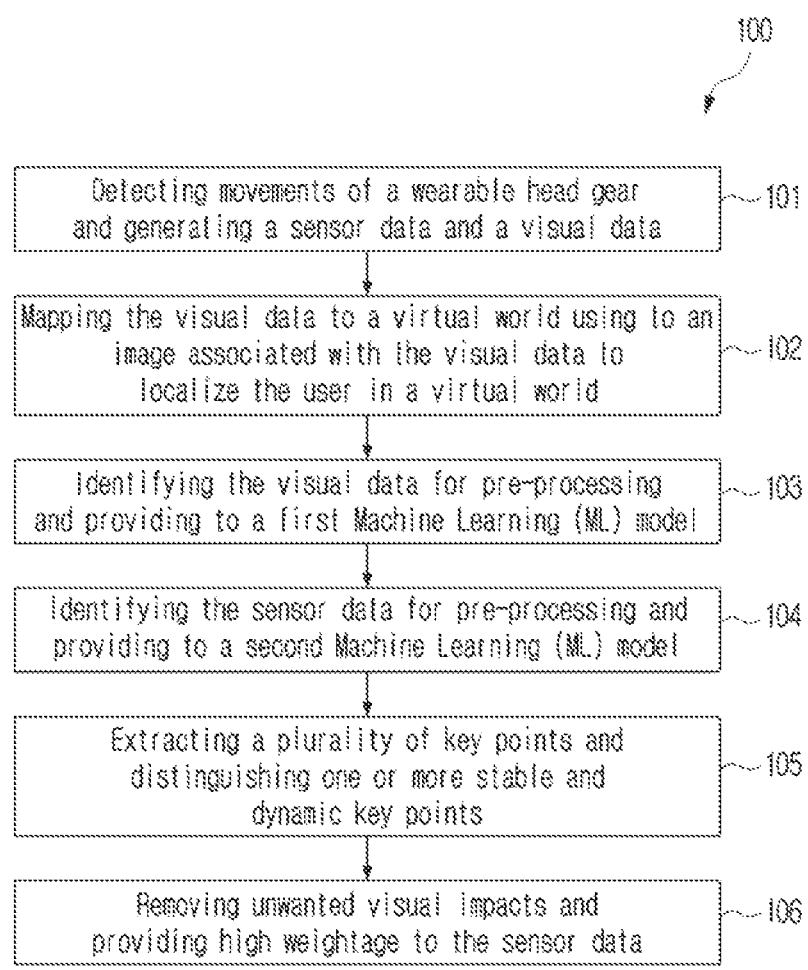
FIG. 1 illustrates a flowchart of a method for intelligent user localization in a metaverse.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The Metaverse is a post-reality universe, a continuous and persistent multiuser environment that combines physical reality and digital virtuality. It is based on the convergence of technologies such as Virtual Reality (VR) and Augmented Reality (AR) that enable multisensory interactions with virtual environments, digital objects, and people. The Augmented Reality (AR) technology permits the implanting of virtual objects into the real world. On the contrary, Virtual Reality (VR) makes use of three-dimensional computer modeling, which happens to be one of the most engrossing types of graphic design, providing an immersive experience in a three-dimensional virtual world.

Metaverse is a three-dimensional, immersive virtual platform where users can interact with one another using Artificial Intelligence (AI)-powered avatars in a highly realistic virtual environment. Metaverse translations are rapidly becoming a path to growth for a variety of businesses engaging consumers through virtual reality gadgets preferably headsets. In some embodiments, the user device/gadget may be a smart phone, tablet device, head-mounted display (I-IMD), gaming console, or wearable device. One of the biggest challenges of user localization in metaverse is the analysis of the complex patterns of human actions such as physical activity.

FIG. 1 illustrates a flowchart of a method 100 for intelligent user localization in a metaverse. As shown in FIG. 1, the method 100 includes the steps of detecting movements of a wearable head gear configured to present virtual content to a user and generating sensor data and visual data in step 101. In an embodiment, the sensor data may be obtained from a sensor preferably an Inertial Measurement Unit (IMU) and the visual data may be obtained from an image capturing device (e.g., a camera). In an embodiment, the image capturing device may be a camera, or a smart phone device. The visual data captures a field of view of the user relative to one or more frame of reference. In an embodiment, the Inertial Measurement Unit (IMU) is an electronic device, capable of measuring and reporting a specific force, angular rate, and sometimes the orientation of the body, using a combination of accelerometers, gyroscopes, magnetometers, and the like.

In step 102 of the method 100, the user is localized in a virtual world by mapping the visual data to a virtual world using an image associated with the visual data. Further, in step 103, the visual data is identified for preprocessing by an image capturing data processor component (203a) of a data and engineering module (203), and the preprocessed visual data is further provided to a first Machine Learning (ML) model.

Further, in step 104 of the method 100, the sensor data is identified for preprocessing by a sensor data processor component (203b) of the data and engineering module (203), and further, the preprocessed sensor data is provided to a second Machine Learning (ML) model.

Further, in step 105, a plurality of key points are extracted from the visual data by key point extractors of a segmentation module (204), and further one or more stable key points and dynamic key points are distinguished from the plurality of key points, wherein the dynamic key points associated with the visual data are removed using the first Machine Learning (ML) model. In an embodiment, the key points are defined as a distinctive point in an input image which is invariant to rotation, scale and distortion.

Furthermore, the unwanted visual impacts corresponding to low weightage weak visual input data are removed and relevant/calculated weightage is provided to the sensor data obtained from the second ML model for reliable tracking by an inertial module (205), in step 106 of the method 100.

In an embodiment of the present disclosure, the real content may be any object existing in the real world, such as a building, a sculpture, a tree, a mountain, a station, and the like.

In an embodiment, the method 100 for intelligent user localization in a metaverse further includes filtering of outliers and providing consistent data to the first Machine Learning (ML) model and the second Machine Learning (ML) model. Further, the method 100 includes tracking the extracted key points using a tracking algorithm with low computational complexity. In an embodiment, the sensor preferably an Inertial Measurement Unit (IMU) measures the acceleration and angular velocity of the device's movement, and the acceleration data must be integrated twice to get the position information. However, the sensor data contains various noises such as bias, which may bring a significant error accumulation. In an embodiment, the sensor data preferably the Inertial Measurement Unit (IMU) data between two consecutive frames are pre-integrated and sparse features are extracted and tracked from the images and further the IMU buffer is maintained as the input of the neural network.

In an embodiment, the method 100 for removing unwanted visual impacts corresponding to low weightage weak visual input data by a processor (201) further includes the steps of determining quality of the key points associated with the visual data and the sensor data by computing weight parameter. The method (106) for removing unwanted visual impacts corresponding to low weightage weak visual input data further includes integrating the visual data, and the sensor data by a multi sensor fusion module (206), wherein the sensor data is first fed to the second Machine Learning (ML) model and then is fed to the multi sensor fusion module (206) for integration.

The method (106) for removing unwanted visual impacts corresponding to low weightage weak visual input data further includes matching the visual data with the second Machine Learning (ML) model data by estimating the scale and initial gravity vector and further, mapping the input sensor data and the sensor data obtained from the second Machine Learning (ML) model on the basis of pre-learned weight.

In an embodiment, the first Machine Learning (ML) model may be a hybrid semantic Machine Learning (ML) model. The Hybrid Machine Learning (MIL) model is a combination of two of more clustering and classification techniques. Specifically, the first component performs the data pre-processing task and the second construct the classification or prediction model based on the output obtained from the first component.

In an embodiment, the second Machine Learning (ML) model may be an inertial network Machine Learning (ML) model based on neural network. More particularly, the second Machine Learning (ML) model may be used to learn prior motion distribution based on the sensor data via a neural network. In an embodiment, the neural network is a method in artificial intelligence that teaches computers to process data in a way that is inspired by the human brain. Another type of machine learning process, called deep learning, uses interconnected nodes or neurons in a layered structure that resembles the human brain. The neural network further includes an input layer, an output (or target) layer and, in between, a hidden layer. The layers of the neural network are connected via nodes, and the connections form a network of interconnected nodes. The node is patterned after a neuron in a human brain.

In an embodiment, to perform the user localization, a framework may be created. The framework may include three parts such as preprocessing, optimization, loop closure and pose graph optimization. In an embodiment, the process of preprocessing may include tracking of the visual features and preintegration of the sensor data (preferably an IMU) between frames in the field of vision of a visual reality or augmented reality. The key points are extracted directly intelligently based on the tracked visual features and machine learning model. The machine learning model may be preferably a deep learning model.

In an embodiment, the process of optimization typically starts with an initialization stage where all the intelligently extracted key points are exploited. The initialization of the optimization process may be based on the couple of visual and inertial data, to form a robust framework that may prevent unrealistic delocalization of an object or user in the virtual world.

In an embodiment, the goal of the loop closure and pose optimization function of the framework is to globally optimize the poses by the use of the information provided by the loop closure and the map reuse mechanisms. The loop closure acts as a tool for reducing the long-term error and thereby improving robustness and is claimed to be a crucial part of the framework.

Figure 2:
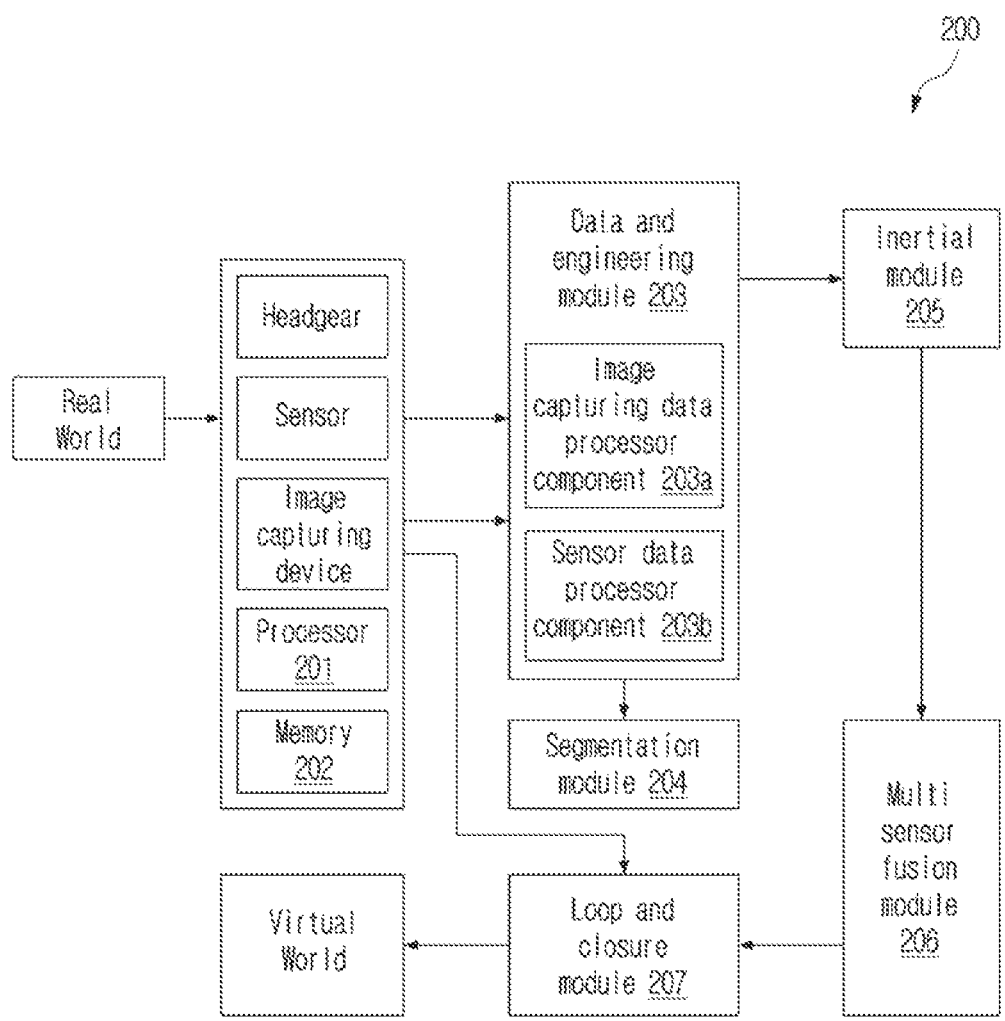
FIG. 2 illustrates a block diagram of a system for intelligent user localization in a metaverse.

Referring to FIG. 2, a block diagram of a system for intelligent user localization in metaverse is illustrated, wherein the system (200) includes a data and engineering module (203) for identifying visual data and sensor data for preprocessing. The data and engineering module (203) of the system (200) may include two components an image capturing data processor component (203a) and a sensor fusion data processor component (203b) respectively. While FIG. 2 illustrates the data and engineering module (203), an inertial module (205), a multi-sensor fusion module (206), and a loop and closure module (207) separately from a processor (201), the data and engineering module (203), the inertial module (205), the multi-sensor fusion module (206), and the loop and closure module (207) may be incorporated into the processor 201, or may be implemented as one or more additional processors.

The image capturing data processor component (203a) takes raw data from the image capturing device and further processes the raw data in accordance with the first Machine Learning (ML) model. The sensor data processor component (203b) takes raw data from the sensors (preferably an IMU sensor like accelerometer, gyroscopes and so on) and processes the raw data in accordance with the second Machine Learning (ML) models.

The data and engineering module (203) of the system (200) further filters outliers and provide consistent data to the first Machine Learning (ML) model and the second Machine Learning (ML) model. In an embodiment, the outliers correspond to the observations that deviate from other observations in a sample and do not conform to an expected pattern or other items in a dataset. Different types of techniques that may be adapted to detect the outliers are as follows: statistical techniques, data mining or machine-learning algorithms and so on. The statistics-based outlier detection techniques assume that the normal data points may appear in high probability regions of a stochastic model, while the outliers may occur in the low probability regions of a stochastic model. In an embodiment, the data and engineering module (203) takes the data from the sensors and calculates position, orientation, and viewing estimates as well as uncertainty estimation. With the help of the sensor data, a map of the observable world, is reconstructed which is then saved in the current map storage database.

Further, the system (200) includes a segmentation module (204) for extracting, tracking the key points associated with the visual data and distinguishing one or more stable and dynamic key points. Further, the system (200) includes an inertial module (205) for removing unwanted visual impacts corresponding to low weightage weak visual input data and providing relevant/calculated weightage to the sensor data obtained from the second Machine Learning (ML) model for reliable tracking. Here, the stable key points mean key points of which locations do not change among the key points extracted by the segmentation module (204), and the dynamic key points mean key points of which locations change according to the time. For example, in the user's field of view, the key points extracted from a fixed picture frame are stable key points, and the key points extracted from a toy car are dynamic key points.

Furthermore, the system (200) includes a processor (201) and a memory (202) which is communicatively coupled to the processor (201), wherein the memory (202) stores processor-executable instructions which, on execution by the processor (201), causes the processor (201) to determine quality of the key points associated with the visual data by computing weight parameter. Further, the processor (201) is configured to integrate the visual data, and the sensor data by a multi sensor fusion module (206), wherein the sensor data is first fed to the second Machine Learning (ML) model and then, the sensor data is fed to the multi sensor fusion module (206) for integration.

Further, the processor (201) is configured to match the visual data with the second Machine Learning (ML) model data by estimating the scale and initial gravity vector and furthermore, the processor (201) is configured to map the input sensor data and the sensor data obtained from the second Machine Learning (ML) model data based on pre-learned weight. Furthermore, the processor (201) is configured to perform loop closure and pose optimization for reducing the localization error.

Furthermore, the system (200) includes a loop and closure module (207) for recognizing whether the user returns a previously mapped region and uses this information to reduce the uncertainty while localizing the user.

Figure 3:
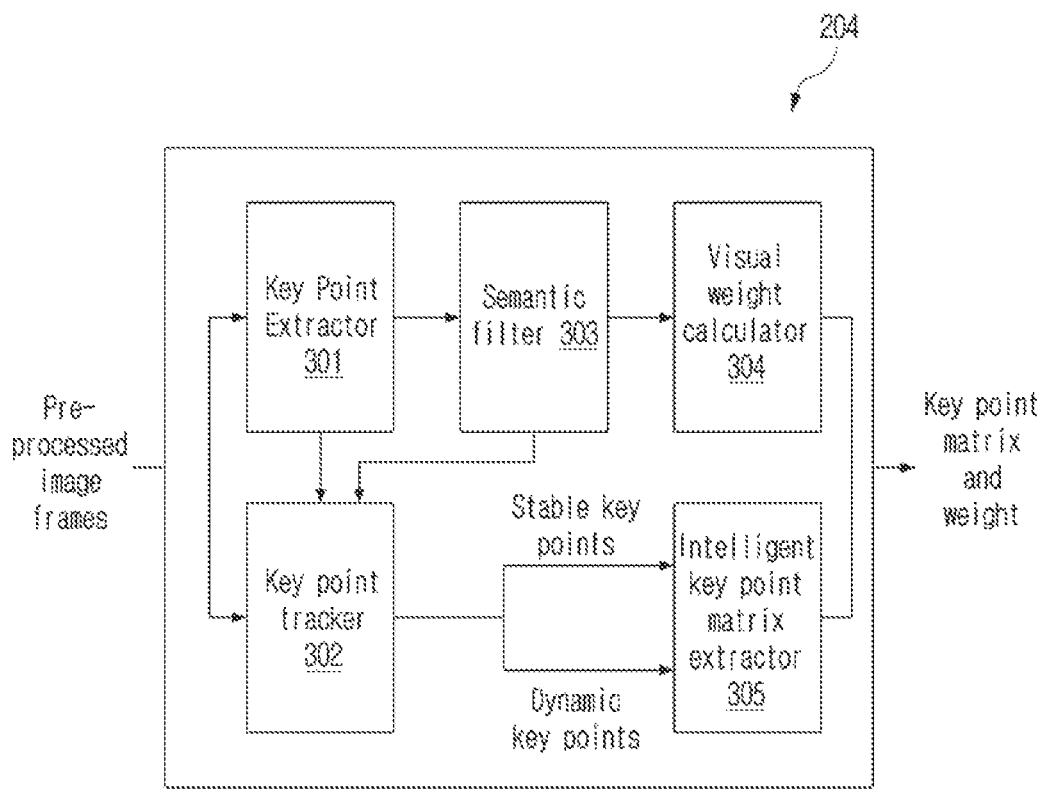
FIG. 3 illustrates a block diagram of a segmentation module.

Referring to FIG. 3, a functional block diagram of the segmentation module is illustrated. The segmentation module (204) includes a key point extractor (301), a key point tracker (302), a semantic filter (303), a visual weight calculator (304), and an intelligent key point matrix extractor (305). The key point extractor (301) is used to detect feature points in the inputted image using image processing techniques such as image restoration, remote sensing, image segmentation and so on. In some instances, the input feature data or more particularly the key points associated with the input image may be sorted into two or more categories. For example, relevant data (such as stationary features) to determine position and orientation may be identified and separated from non-relevant data (such as moving object in frame).

In an embodiment, the segmentation module (204) divides a digital image into subgroups called image segments, reducing the complexity of the image and further, enables processing or analysis of each image segment. More particularly, segmentation is the assignment of labels to pixels to identify objects, people, or other important elements in the image. Some common image segmentation techniques are as follows: edge-based segmentation, threshold-based segmentation, region-based segmentation, cluster-based segmentation and so on.

The key point tracker (302) of the segmentation module (204) tracks the extracted key points using a tracking algorithm with low computational complexity. The tracking algorithm may keep track of the key points extracted from an object in an image, even as the object moves or the camera's perspective changes. For example, the tracking algorithm may perform feature detection to detect key points or features on the object in an initial frame of an image sequence, and detect key points on the object in each subsequent frame, and may perform feature matching to the detected features in the current frame with the features from the initial frame. The matching may be conducted based on certain similarity metrics like Euclidean distance, cosine similarity, or normalized cross-correlation. If the variance in key point positions detected from an object across two or more consecutive frames exceeds a predetermined threshold, the object may be classified as a dynamic or moving object. In such a case, the identified key points would be categorized as dynamic key points. Conversely, if the variation remains below the threshold, the object may be identified as a static object, and the key points detected from it may be labeled as static key points.

The semantic filter (303) (preferably an Artificial Intelligence (AI) based filter) determines and filter static and dynamic key points in the frame associated with the inputted image using semantic segmentation network.

The visual weight calculator (304) computes a weight parameter for each frame to further, determine the quality of key points associated with the inputted image.

The intelligent key point extractor (305) determines truly dynamic points. For determining truly dynamic key points, the static and the dynamic key points may pass through Random Sample Consensus (RANSAC) algorithms. Furthermore, the dynamic key points associated with the inputted image are removed using the first Machine Learning (ML) model. In other words, the dynamic key points associated with the visual data are removed using the first Machine Learning (ML) model.

In an embodiment, the Random Sample Consensus (RANSAC) is an iterative method to estimate parameters of a mathematical model from a set of observed data that contains outliers, when outliers are to be accorded no influence on the values of the estimates. The Random Sample Consensus (RANSAC) algorithm estimates parameters of a model by random sampling of the observed data. For a given dataset whose data elements contain both inliers and outliers, the Random Sample Consensus (RANSAC) algorithm uses the voting scheme to determine the optimal fitting result. The data elements in the dataset are used to vote for one or multiple models. The implementation of this voting scheme is based on two assumptions: that the noisy features may not vote consistently for any single model (few outliers) and there are enough features to agree on a good model (few missing data). The Random Sample Consensus (RANSAC) algorithm is essentially composed of two steps that are iteratively repeated: In the first step, a sample subset containing minimal data items is randomly selected from the input dataset. A fitting model and the corresponding model parameters are computed using only the elements of this sample subset. The cardinality of the sample subset is the smallest sufficient to determine the model parameters. In the second step, the algorithm checks which elements of the entire dataset are consistent with the model instantiated by the estimated model parameters obtained from the first step. A data element will be considered as an outlier if it does not fit the fitting model instantiated by the set of estimated model parameters within some error threshold that defines the maximum deviation attributable to the effect of noise. The set of inliers obtained for the fitting model is called the consensus set.

Figure 4:
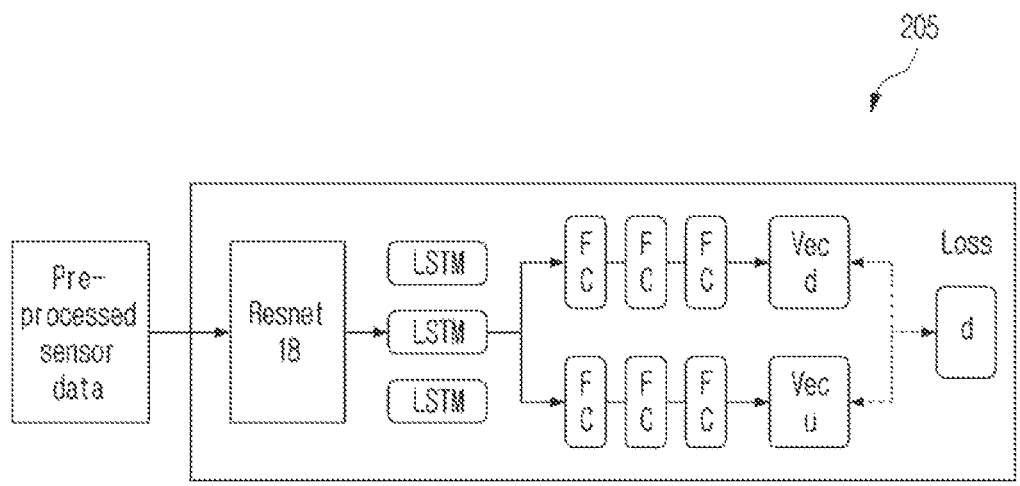
FIG. 4 illustrates a block diagram of an inertial module.

Referring to FIG. 4, a block diagram of the inertial module is illustrated, wherein the inertial module (205) includes an inertial model to learn human motion. The inertial model may be implemented using a neural network. The neural network is a series of algorithms that endeavors to recognize underlying relationships in a set of data through a process that mimics the way the human brain operates. The neural network is further used to learn prior motion distribution. The inertial module (205) may include a residual neural network (ResNet), a plurality of long short-term memory (LSTM) networks, and a plurality of fully connected (FC) layers. The inertial module (205) takes the data from the sensor preferably an Inertial Measurement Unit (IMU). The received sensor data between two consecutive frames are pre-integrated and further, sparse features are extracted and tracked from the images (captured from an image capturing device such as a camera) in the inertial preprocessing stage. The sensor data buffer is maintained as an input for the neural network. The neural network takes a local window of the sensor data as input, without obtaining the initial velocity, and regresses the three-dimensional relative displacement and uncertainty of the window.

In an embodiment, an artificial neural network is used in the fields of artificial intelligence and deep learning such as Long short-term memory (LSTM). The Long short-term memory (LSTM) has feedback connections. The Long short-term memory (LSTM) is a variety of recurrent neural networks (RNNs) that are capable of learning long-term dependencies, especially in sequence prediction problems. More particularly, the Long short-term memory (LSTM) is capable of processing the entire sequence of data, apart from single data points such as images and may further find application in speech recognition, machine translation, and so on. The Long short-term memory (LSTM) unit is composed of a cell, an input gate, an output gate and a forget gate. The cell remembers values over arbitrary time intervals and the three gates regulate the flow of information into and out of the cell. Long short-term memory (LSTM) networks are well-suited to classifying, processing and making predictions based on time series data, since there can be lags of unknown duration between important events in a time series.

Figure 5:
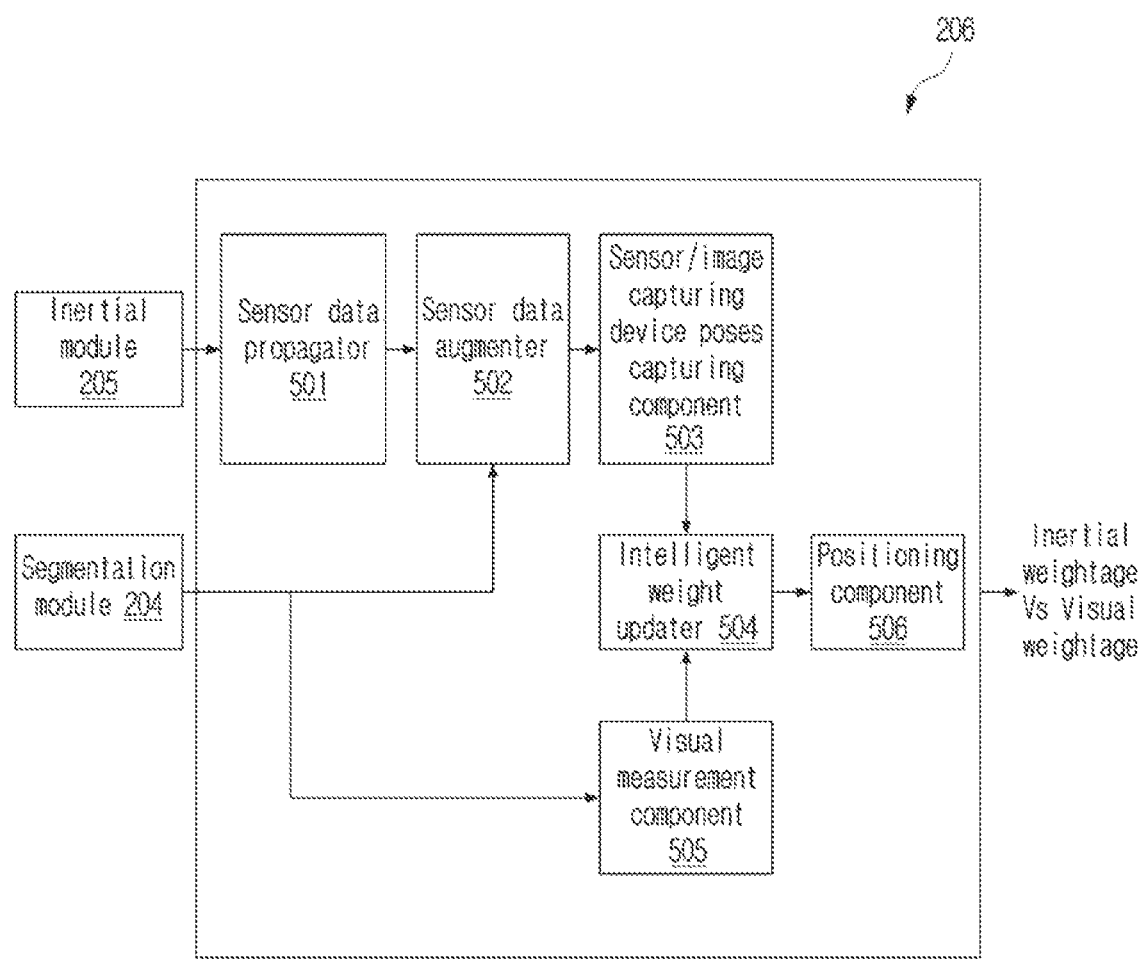
FIG. 5 illustrates a block diagram of a multi sensor fusion module.

Referring to FIG. 5, a block diagram of the multi sensor fusion module is illustrated, wherein the multi sensor fusion module (206) includes a sensor data propagator (501), a sensor data augmenter (502), a sensor/image capturing device poses capturing component (503), an intelligent weight updater (504), a visual measurement component (505) and a positioning component (506). The multi sensor fusion module (206) tightly integrates visual data, sensor data and neural inertial network measurements using multi-sensor fusion motion tracking, wherein the sensor data is first fed to the second Machine Learning (ML) model and then is fed to the multi sensor fusion module (206) for integration.

In order to address the issue of the absence of visual input key points or field of view image destabilization, the present embodiment intelligently considers the low weightage of weak visual inputs and provides relevant/calculated weightage to the sensor data obtained from the second Machine Learning (ML) model for reliable tracking, thereby removing unwanted visual impacts in the virtual world in the case of weak visual input key points.

In an embodiment, the objective of the multi sensor fusion module (206) is to minimize the prior measurement of Ck+1 for all the measurements at each time step k+1, by the intelligent weight updater (504) using the intelligent weight update function given as—

$$C_{k+1} = C_k + C_u + C_z$$

Where Ck is the prior measurement, Cu is the sensor measurement, and Cz is the visual measurement.

In an embodiment, the sensor data propagator (501) may receive sensor data, aggregate the sensor data based upon the sensor identifications and sensor classifications, and may further, forward the sensor data to the sensor data augmenter (502), wherein the sensor data is augmented, thereby expanding the sampled feature space such that the neural network may learn an improved decision boundary to improve generalization on unseen samples. In an embodiment, the sensor/image capturing device poses capturing component (503) captures the human poses in real time.

Figure 6:
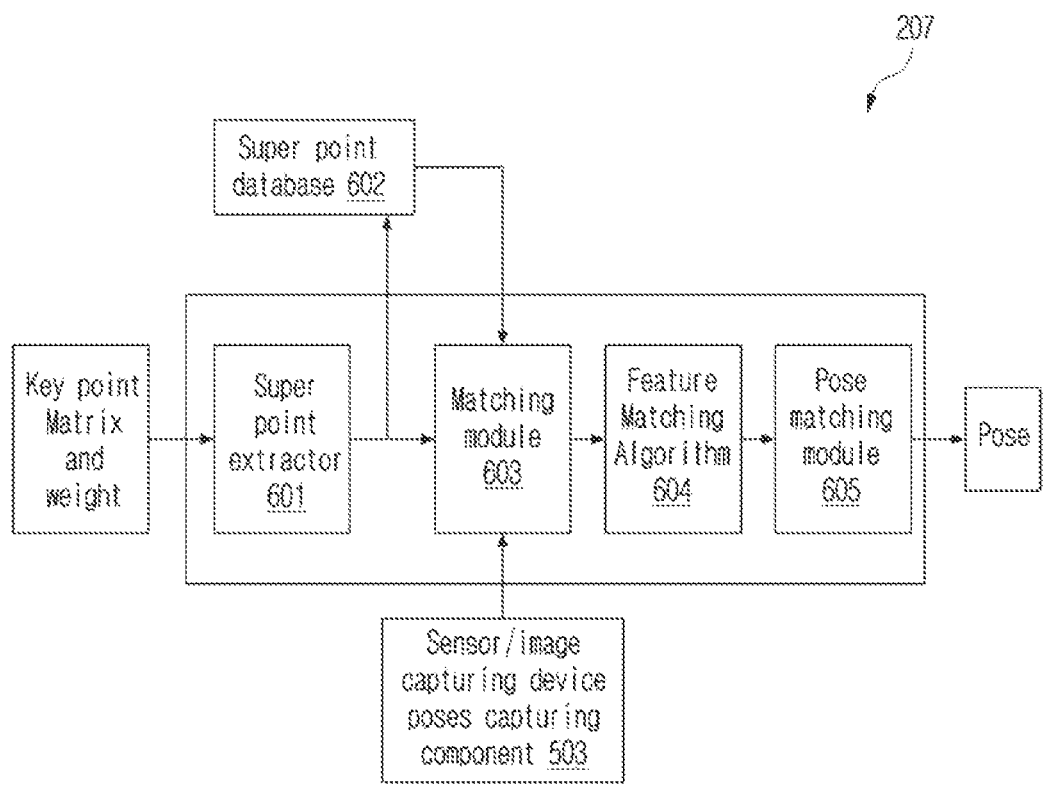
FIG. 6 illustrates a block diagram of a loop and closure module.

Referring to FIG. 6, a functional block diagram of the loop and closure module (207) is illustrated. The loop and closure module (207) is configured to recognize whether the user has returned to a previously mapped region and further uses the information to reduce the uncertainty while localizing the user. The loop and closure module (207) includes a super point extractor (601), a super point database (602), a matching module (603), a feature matching algorithm (604), and a pose matching module (605). The super point extractor (601) extracts the key points with large weights from key point matrix which is obtained by visual preprocessing. The super point database (602) saves the key frames and further, in order to save key frames, a bag of words representing them is used in place of the raw frames due to memory constraints. The matching module (603) matches the current super point and current frame with all the super points stored in the super point database (602). The feature matching algorithm (604) uses pre-learned weights for feature matching. The pose matching module (605) matches the exact pose between the matched point and current point.

In an embodiment, the super point extractor (601) is a feature extraction algorithm based on full-convolutional neural network. The super point extractor (601) architecture consists of a single Visual Geometry Group (VGG)-style encoder and two decoders. The encoder may include convolution layers, non-linear activation functions named as Rectified Linear Activation Unit (ReLU) and pooling layer. The encoder is further used to process and reduce the dimensionality of the input images. After the encoder, the architecture is divided into two decoders. The decoder learns weights for different tasks through multiple trainings. One of the decoders is trained for detecting interest points, while the other decoder is trained to detect the corresponding descriptors. In an embodiment, the encoder is defined as the series of layers that extract image features using progressively deeper, narrower filters. The encoder might be pre-trained on a similar task (e.g., image recognition), allowing it to leverage its existing knowledge to perform the segmentation tasks. On the contrary, the decoder is defined as the series of layers that gradually convert the encoder's output into a segmentation mask corresponding with the input image's pixel resolution.

In an embodiment, the loop and closure module (207) is based on loop and closure detection technique. The loop and closure detection technique is further categorized into three different categories such as map to map loop and closure detection technique, map to sensor loop and closure detection technique, and sensor to sensor loop and closure detection technique. The map-to-map loop and closure detection technique matches the geometric features within the map. More particularly, the technique uses both similarity in visual appearance (unary constraints) and relative distances between features (binary constraints) to find the largest compatible set of common features between two submaps, whereas the map to sensor loop and closure detection technique matches the latest sensor data to other regions of the map. Further, the sensor-to-sensor loop and closure detection technique matches the latest sensor data to some previously acquired sensor data.

In an embodiment, the matching module (603) may be based on a K-Nearest Neighbour (KNN) matching algorithm. The KNN is a non-parametric, lazy learning algorithm. Its purpose is to use a database in which the data points are separated into several classes to predict the classification of a new sample point. It simply calculates the distance of a new data point to all other training data points. The distance can be of any type. It then selects the K-nearest data points, where K can be any integer. Finally, it assigns the data point to the class to which the majority of the K data points belong. The output of K-Nearest Neighbour (KNN) matching algorithm depends on whether k-NN is used for classification or regression: In k-NN classification, the output is a class membership. In k-NN classification, an object is classified by a plurality vote of its neighbors, with the object being assigned to the class most common among its k nearest neighbors (k is a positive integer, typically small). If k=1, then the object is simply assigned to the class of that single nearest neighbor. In k-NN regression, the output is the property value for the object. This value is the average of the values of k nearest neighbors.

In an embodiment, super glue matching algorithm may be used to match for feature matching based on pre-learned weights. The superglue is a neural network that matches two sets of local features by jointly finding correspondences and rejecting non-matchable points. The superglue algorithm aims to solve the limitations by performing context aggregation, matching and filtering in a single end-to-end architecture. In an embodiment, a Perspective-n-Point (PnP) and pose matching algorithm may be used to match the exact pose between the matched point and current point.

In an embodiment, Perspective-n-Point (PnP) is the problem of estimating the pose of a calibrated camera given a set of n 3D points in the world and their corresponding 2D projections in the image. The camera pose consists of 6 degrees-of-freedom (DOF) which are made up of the rotation (roll, pitch, and yaw) and 3Dimensional translation of the camera with respect to the world. The problem originates from the image capturing device preferably a camera calibration and has many applications in computer vision and other areas, including 3Dimensional pose estimation, robotics and augmented reality.

In an embodiment of the present disclosure, a first use case is explained such as the key points may be extracted from various visual elements in the field of vision of the user for user localization in virtual world without any filter/intelligence. In such a scenario, with the use of the present invention, all the key points are used including key points generated from the dynamic object causing distortions in the user's localization in the metaverse. With the help of the present invention, the inertial movement of the user are tracked using the sensors, the sensor data is fed to the second Machine Learning (ML) model to eliminate the errors generated due to user's unintended motions. More particularly, the raw images in the field of view of visual reality camera is fed to the first Machine Learning (ML) model. The first ML model uses segmentation to separate the dynamic objects that are present in the raw image and after segmentation the dynamic key points may not be considered while mapping. The extracted key points are classified as Green→Filtered, Blue→Tracked and Red→Not Tracked. The process of image segmentation creates a pixel-wise mask for each object in the image and provides a far more granular understanding of the object(s) in the image. More particularly, the pixel values for the objects and the image's background are different and certain threshold value may be set. The pixel values falling below or above the predefined threshold value may be classified accordingly (as an object or the background). In this case the visual weightage is more as compared to the inertial weightage due to the presence of the dynamic object. Resultantly, the delocalization of the user due to a dynamic object is reduced to a minimum. Furthermore, the unwanted visual impacts corresponding to low weightage weak visual input data are removed and relevant/calculated weightage is provided to the sensor data obtained from the second ML model for reliable tracking by an inertial module (205).

In another embodiment of the present disclosure, a second use case is explained such as when the user is staying at the same position or may be looking up at the roof completely painted white in color lacks visual inputs to the mapping method. In such a scenario, with the implementation of the present invention, the inertial movement of the user are tracked using the sensors, further the sensor data is fed to the second Machine Learning (ML) model to keep track of the user and eliminate the errors generated due to user's unintended motions. More particularly, the raw images in the field of view of visual reality camera is fed to the first Machine Learning (ML) model. Since the user is staring at the ceiling there are no key point that are used for user's localization. In this case, the inertial weightage is higher than the visual weightage, so the localization is done using inertial weights. In other words, where visual key points may be not be extracted. And further, in the field of view of the user, no changes in the pixel values may be obtained, key points are unable to be generated for mapping, since no key points are available to localize the user in the virtual world, the user's avatar may not be visible in the Virtual Reality (VR). With the implementation of the present invention, the problem of the absence of visual input key points or field of view image destabilization can be solved by intelligently taking into account the low weightage of weak visual inputs and providing relevant/calculated weightage to inertial sensor data from the learned sensor model, thereby removing unwanted visual impacts in the virtual world in the case of weak visual input key points.

In an embodiment of the present disclosure, a third use case is explained such as when the user is using the Virtual Reality (VR) headset in the living room. Most of the objects in the surrounding are stationary and may be taken as key points while mapping from real world to the virtual world. As per the prior art, all the key points including key points associated with the dynamic objects, from the real world are considered and further mapped to the virtual world. As the dynamic objects moves in the real world, the user's avatar also displaces due to the error induced by that object. By the way of an example, the dynamic object is a toy car, whose key points may move in successive frames. The process of mapping may cause unrealistic distortion in the metaverse, even though there is no actual intended movement by the user. In such a case, with the implementation of the present invention, the data form the sensors may help to determine the user inertial movements and the errors due to inertial movements are eliminated using second Model. And further, the raw images are fed to the first Machine Learning (ML) model, where all key points that are generated due to dynamic object are removed. In such a case, the visual weightage is more as compared to the inertial weightage due to dynamic object and as a result, the user's delocalization due to a dynamic object may be reduced to a minimum. In other words, when the user's field of view includes a variety of items, the visual weightage may be higher than the inertial weightage in that case, because the user's field of view includes a variety of objects that need to be distinguished from one another.

The embodiments of the present disclosure provide a method to localize the human in the virtual world based on mapping of user existence and maintaining dynamicity of the user based on the key points extracted from the real world and the inertial movements of the user. Additionally, the embodiments of the present disclosure focus on where to place the user in the virtual world based on the key points extracted from the field of view.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A method for intelligent user localization in a metaverse, the method comprising:
   detecting movements of a wearable head gear configured to present virtual content to a user, and generating sensor data and visual data using an inertial sensor and a camera, respectively, wherein the visual data captures a field of view of the user relative to one or more frame of reference;

mapping the visual data to a virtual world using an image associated with the visual data to localize the user in the virtual world;

providing the visual data to a first Machine Learning (ML) model;

providing the sensor data to a second ML model;

extracting a plurality of key points from the visual data and distinguishing stable key points and dynamic key points among the plurality of key points;

removing the dynamic key points associated with the visual data using the first ML model; and removing visual impacts corresponding to the visual data having a relatively low weightage, and providing a relatively high weightage to the sensor data processed through the second ML model.

2. The method as claimed in claim 1, wherein the method for removing the visual impacts corresponding to the visual input data having the relatively low weightage, comprises:

determining a quality of the key points associated with the visual data and the sensor data by computing a weight parameter;

integrating the visual data and the sensor data, wherein the sensor data is first fed to the second ML model and then is integrated with the visual data;

matching the visual data with output data of the second ML model by estimating a scale and initial gravity vector; and mapping the sensor data that is input from the inertial sensor, with the sensor data obtained from the second ML model based on a pre-learned weight.

3. The method as claimed in claim 1, further comprising:
filtering outliers and providing consistent data to the first ML model and the second ML model; and
tracking the extracted key points using a tracking algorithm.

4. The method as claimed in claim 1, wherein the inertial sensor and the camera are mounted in the wearable head gear.

5. The method as claimed in claim 1, wherein the visual data is identified for preprocessing by extracting and tracking one or more sparse features from two consecutive frames of reference of a field of view of the user.

6. The method as claimed in claim 1, wherein the key points are extracted without filtration, based on tracked visual features and ML models.

7. The method as claimed in claim 1, wherein the first ML model comprises one or more Artificial Intelligence (AI) filters to distinguish the stable key points and the dynamic key points associated with the visual data.

8. The method as claimed in claim 1, wherein the dynamic key points are removed from the visual data using segmentation.

9. The method as claimed in claim 1, wherein the plurality of key points exceeding a predetermined weight threshold are obtained from a key point matrix by visual preprocessing.

10. A system for intelligent user localization in a metaverse, the system comprising:
a memory storing one or more instructions; and
one or more processors configured to execute the one or more instructions to:
provide visual data to a first machine learning (ML) model; and
provide sensor data to a second ML model,
extract a plurality of key points associated with the visual data;
distinguish stable key points and dynamic key points among the plurality of key points;
remove dynamic key points associated with the visual data using the first ML model; and
remove visual impacts corresponding to the visual data having a relatively low weightage, and provide a relatively high weightage to the sensor data processed through the second ML model.

11. The system as claimed in claim 10, wherein the memory is communicatively coupled to the one or more processors.

12. The system as claimed in claim 10, wherein the one or more processors are configured to execute the one or more instructions to:
determine a quality of the key points associated with the visual data by computing a weight parameter;
integrate the visual data and the sensor data, wherein the sensor data is first fed to the second ML model and then is integrated with the visual data;
match the visual data with output data of the second ML model by estimating a scale and initial gravity vector; and
map the sensor data that is input from the inertial sensor, with the sensor data obtained from the second ML model data based on a pre-learned weight.

13. The system as claimed in claim 10, wherein the sensor data is extracted from an inertial sensor of the system.

14. The system as claimed in claim 10, wherein the one or more processors are configured to perform loop closure and pose optimization for reducing a localization error.

15. A non-transitory computer readable storage medium storing a program that is executable by one or more processors to perform a controlling method, the controlling method comprising:
detecting movements of a wearable head gear configured to present virtual content to a user, and generating sensor data and visual data using an inertial sensor and a camera, respectively, wherein the visual data captures a field of view of the user relative to one or more frame of reference;
mapping the visual data to a virtual world using an image associated with the visual data to localize the user in the virtual world;
providing the visual data to a first Machine Learning (ML) model;
providing the sensor data to a second ML model;
extracting a plurality of key points from the visual data and distinguishing stable key points and dynamic key points, among the plurality of key points;
removing the dynamic key points associated with the visual data using the first ML model; and
removing visual impacts corresponding to the visual data having a relatively low weightage, and providing a relatively high weightage to the sensor data processed through the second ML model.

* * * * *